United States Patent
Ohashi (10) Patent No.: US 10,573,316 B2
(45) Date of Patent: Feb. 25, 2020

(54) INFORMATION PROCESSING SYSTEM

(71) Applicant: KYOCERA Document Solutions Inc., Osaka (JP)

(72) Inventor: Akira Ohashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/989,417

(22) Filed: May 25, 2018

(65) Prior Publication Data

US 2018/0342249 A1 Nov. 29, 2018

(30) Foreign Application Priority Data

May 29, 2017 (JP) .................................. 2017-105621
May 29, 2017 (JP) .................................. 2017-105622

(51) Int. Cl.
*G10L 15/26* (2006.01)
*G10L 15/22* (2006.01)
*G10L 15/24* (2013.01)
*G06Q 10/10* (2012.01)

(52) U.S. Cl.
CPC .............. *G10L 15/26* (2013.01); *G06Q 10/10* (2013.01); *G10L 15/22* (2013.01); *G10L 15/24* (2013.01)

(58) Field of Classification Search
CPC ......... G10L 15/26; G10L 15/22; G10L 15/24; G06Q 10/10

USPC .......................................................... 704/235
See application file for complete search history.

(56) References Cited

U.S. PATENT DOCUMENTS

| 10,110,831 B2* | 10/2018 | Takita ..................... H04N 7/147 |
| 2001/0034773 A1* | 10/2001 | Kujirai ..................... G06F 21/10 709/217 |
| 2008/0221882 A1* | 9/2008 | Bundock .................. G10L 15/26 704/235 |
| 2010/0271456 A1* | 10/2010 | Tsumura ................... H04N 7/15 348/14.08 |

FOREIGN PATENT DOCUMENTS

JP 2013-109106 A 6/2016

* cited by examiner

*Primary Examiner* — Quynh H Nguyen
(74) *Attorney, Agent, or Firm* — Studebaker & Brackett PC (57) ABSTRACT

An information processing system includes one or more acquiring devices and an image forming apparatus. The acquiring devices acquire proceedings information indicating meeting content from a plurality of participants participating in a meeting. The image forming apparatus deletes unnecessary information that is unnecessary as transcript content from the proceedings information and generates transcript information indicating the transcript content. According to the information processing system, work of deleting the unnecessary information from the transcript decreases, and an amount of work for a worker can be mitigated.

9 Claims, 6 Drawing Sheets

INFORMATION PROCESSING SYSTEM

INCORPORATION BY REFERENCE

The present application claims priority under 35 U.S.C. § 119 to Japanese Patent Application Nos. 2017-105621 and 2017-105622, filed on May 29, 2017. The contents of these applications are incorporated herein by reference in their entirety.

BACKGROUND

The present disclosure relates to an information processing system.

A transcript generating system includes a transcript generating device and a plurality of information terminals. Each information terminal is used by a different participant in a meeting. The information terminal displays meeting material. The transcript generating device converts spoken content during the meeting into character information. The transcript generating device associates the character information with material information to generate a transcript. The material information indicates the meeting material. The material information is acquired from the information terminal.

SUMMARY

An information processing system according to the present disclosure includes one or more acquiring devices and a terminal device. The acquiring devices acquire proceedings information indicating meeting content from a plurality of participants participating in a meeting. The terminal device deletes unnecessary information that is unnecessary as transcript content from the proceedings information and generates transcript information indicating the transcript content.

An information processing system according to the present disclosure includes one or more acquiring devices and a terminal device. The acquiring devices acquire proceedings information indicating meeting content following a time line from a plurality of participants participating in a meeting. The terminal device specifies question and answer content indicating content of a question and an answer between a questioner and a presenter among the plurality of participants from the transcript information. The terminal device generates transcript information indicating transcript content based on the question and answer content.

DETAILED DESCRIPTION

Embodiments of the present disclosure will be described as follows with reference to the drawings. However, the present disclosure is not limited to the following embodiments. It should be noted that elements in the drawings that are the same or equivalent are labelled using the same reference signs and description thereof is not repeated.

First Embodiment

Figure 1:
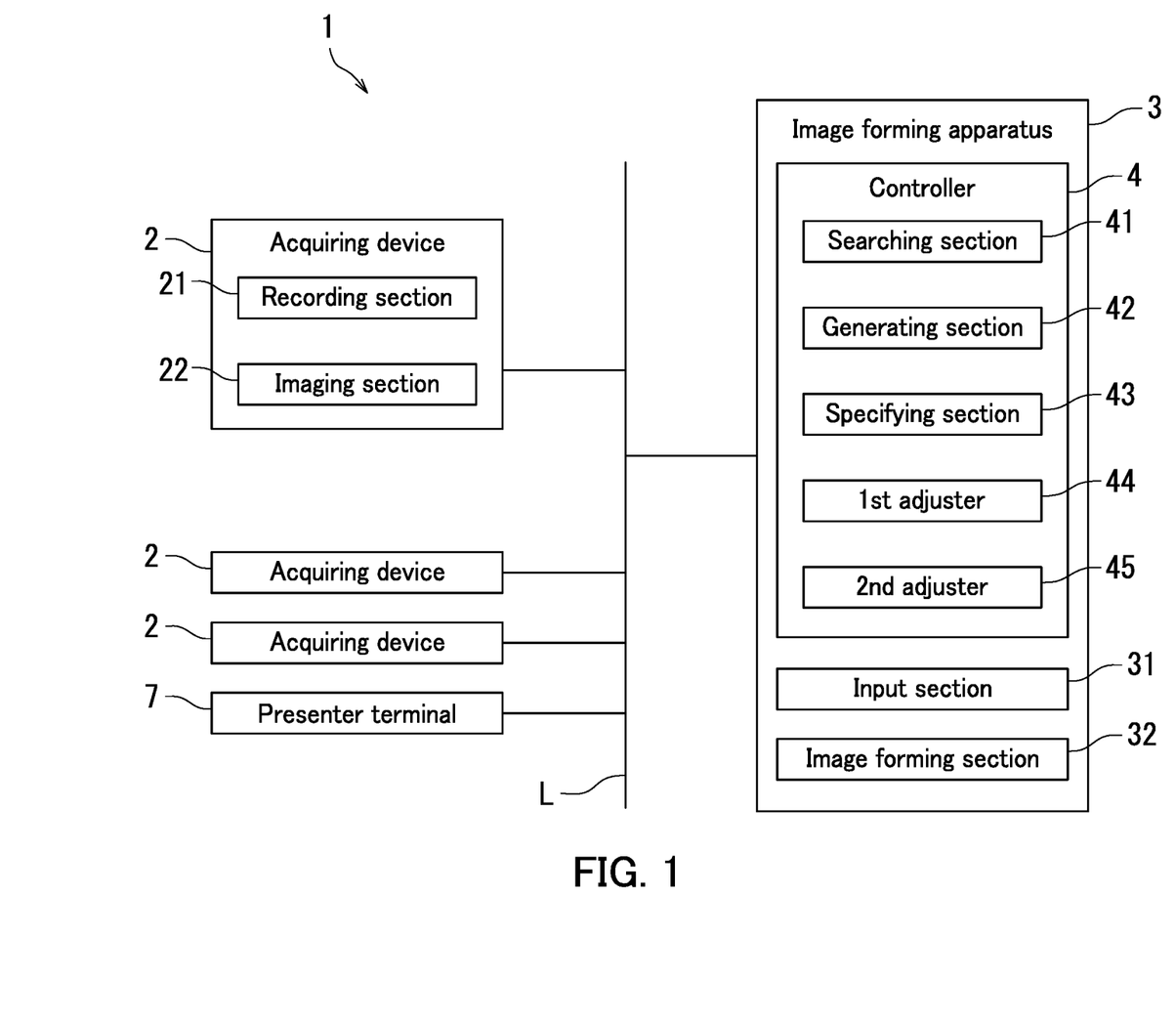
FIG. 1 is a block diagram illustrating an information processing system according to embodiments of the present disclosure.

An information processing system 1 according to a first embodiment of the present disclosure will be described with reference to FIG. 1. FIG. 1 is a block diagram illustrating the information processing system 1 according to the present embodiment. According to the present embodiment, the information processing system 1 produces a transcript. Character information is recorded in the transcript. The character information indicates content of a meeting.

Herein, a meeting is defined as something in which multiple participants participate to make a decision, for example. The meeting may also be a speech or a lecture according to the present disclosure. A speech is defined as something in which talking proceeds according to a subject. A lecture is defined as something in which talking proceeds about a method and an outcome of study.

The participants include a presenter and a questioner, for example. The presenter describes presentation content using material, for example. The presenter also answers a question from the questioner. The questioner asks a question about a description of the presentation content.

As illustrated in FIG. 1, the information processing system 1 includes a plurality of acquiring devices 2, an image forming apparatus 3, and a presenter terminal 7. In the information processing system 1, the acquiring devices 2, the image forming apparatus 3, and the presenter terminal 7 are connected through a communication network L. Examples of the communication network L include the Internet, a wide area network (WAN), and a local area network (LAN).

The presenter terminal 7 is a notebook personal computer, for example. The presenter terminal 7 stores a plurality of materials. The materials are used in the meeting when the presenter describes the presentation content. The materials are images exhibiting slides, for example. The slides include material images, character images, and augmented reality (AR) markers. An AR marker is for distinguishing one material from another material.

The presenter terminal 7 includes a display section, for example. The presenter terminal 7 displays the materials in order on the display section in the meeting. As a result, the participants can see the materials through the display section. Note that the presenter terminal 7 may display the materials in order on a wall of a meeting room through a projector, for example. Also, the presenter terminal 7 may display the materials in order on displays of notebook personal computers possessed by the participants, for example.

The presenter terminal 7 outputs material information to the image forming apparatus 3 after the meeting has ended, for example. The material information is information in which each of the materials is associated with a time line according to when the material was used in the meeting.

Specifically, the material information includes the materials and usage information. The usage information indicates when each material was used in the meeting in the form of the time line. Note that the presenter terminal 7 may output the material information to the image forming apparatus 3 before the meeting begins, for example. In this case, the material information is information in which each of the materials is associated with a scheduled time line according to when the material is to be used in the meeting.

The acquiring devices 2 acquire proceedings information from the participants. The proceedings information indicates the content of the meeting in the form of a time line. Each of the participants possesses an acquiring device 2. According to the present embodiment, the proceedings information includes voice information and proceedings image information. The voice information indicates spoken content and speaking volume of the participant. The proceedings image information indicates an image exhibiting an environment in a field of view of the participant. Each acquiring device 2 outputs the proceedings information to the image forming apparatus 3.

Each acquiring device 2 includes a recording section 21 and an imaging section 22. The recording section 21 records the voice of a participant. The recording section 21 outputs the recorded voice to the image forming apparatus 3 as the proceedings information. The imaging section 22 records a proceedings image. Typically, the proceedings image is a video. The imaging section 22 outputs the proceedings image to the image forming apparatus 3 as the proceedings information.

The image forming apparatus 3 is an example of a terminal device according to the present disclosure. The image forming apparatus 3 includes an input section 31, an image forming section 32, and a controller 4. The image forming section 32 forms an image on a recording medium based on image data. According to the present embodiment, the image forming section 32 produces a transcript on the recording medium based on transcript information. The transcript information indicates transcript content.

The input section 31 outputs an operation signal to the controller 4. The operation signal corresponds to an operation of an operator who operates the image forming apparatus 3. The operation of the operator includes various settings of the image forming apparatus 3, for example.

The controller 4 includes a processor and storage, for example. The processor is a central processing unit (CPU), for example. The storage includes semiconductor memory and a hard disk drive (HDD), for example. The processor controls the input section 31 and the image forming section 32 according to a computer program. The computer program is prestored in the storage.

The storage stores the proceedings information inputted from each acquiring device 2. The storage stores the proceedings information in association with the participants. In detail, the storage prestores identification numbers of the acquiring devices 2, individual names of the participants, and classification of the participants. The identification numbers mean numbers that are assigned to the respective acquiring devices 2. The identification numbers are used to identify individual acquiring devices 2. The individual names of the participants are stored in association with the identification numbers. In other words, the participants and the acquiring devices 2 are stored in association with each other. The classification of the participants is stored in association with the identification numbers. The classification of the participants indicates whether or not the participants are first participants. The first participants include the presenter. The first participants further include predetermined participants among the participants aside from the presenter. The classification of the participants further indicates whether or not each first participant is the presenter. The storage stores the proceedings information in association with the identification numbers. As a result, the proceedings information is stored in the storage in association with each of the participants.

The storage also stores the material information inputted from the presenter terminal 7. The storage stores the material information in association with the identification number of an acquiring device 2 used by the presenter.

The controller 4 generates the transcript information based on the proceedings information and the material information. The processor of the controller 4 functions as a searching section 41, a generating section 42, a specifying section 43, a first adjuster 44, and a second adjuster 45 according to the computer program. The searching section 41, the generating section 42, the specifying section 43, the first adjuster 44, and the second adjuster 45 will later be described in detail with reference to FIGS. 4A and 4B.

Figure 2:
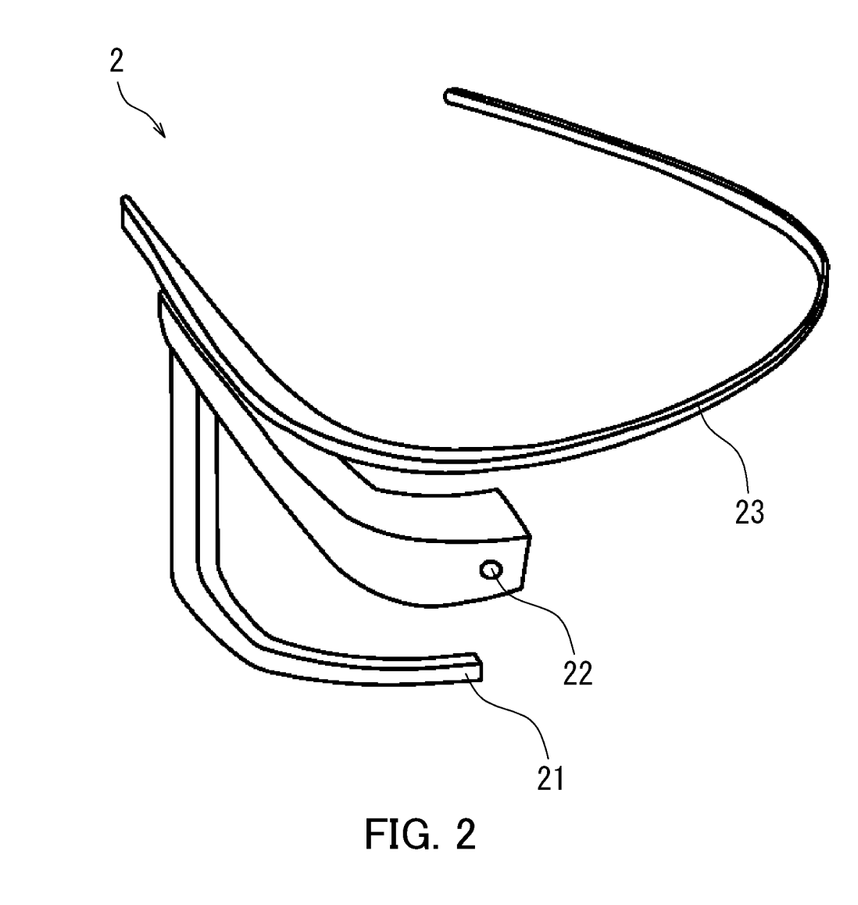
FIG. 2 is a perspective view illustrating an acquiring device according to the embodiments of the present disclosure.

Next, a configuration of the acquiring devices 2 will be further described with reference to FIGS. 1 and 2. FIG. 2 is a perspective view illustrating an acquiring device 2. As illustrated in FIG. 2, the acquiring device 2 further includes a main body 23 in addition to the recording section 21 and the imaging section 22. According to the present embodiment, the acquiring device 2 is a head mounted display.

The main body 23 has a U-shape. The main body 23 is mounted on the head of a participant. The main body 23 supports the recording section 21 and the imaging section 22. The recording section 21 includes a frame and a microphone, for example. The frame extends from the main body 23. The microphone is placed on or near a front end of the frame. The microphone is located near the mouth of the participant when the main body 23 is mounted on the head of the participant. As a result, the recording section 21 can record the voice of the participant.

The imaging section 22 includes a frame and an image sensor. The frame extends from the main body 23. The image sensor is placed on or near a front end of the frame. The image sensor is a charge-coupled device (CCD) image sensor, for example. The image sensor is located near an eye of the participant when the main body 23 is mounted on the head of the participant. As a result, the imaging section 22 can record the proceedings image. Note that the acquiring device 2 may include a lavalier microphone to be mounted on the chest of the participant, and an image sensor colocated with the lavalier microphone, for example.

Figure 3:
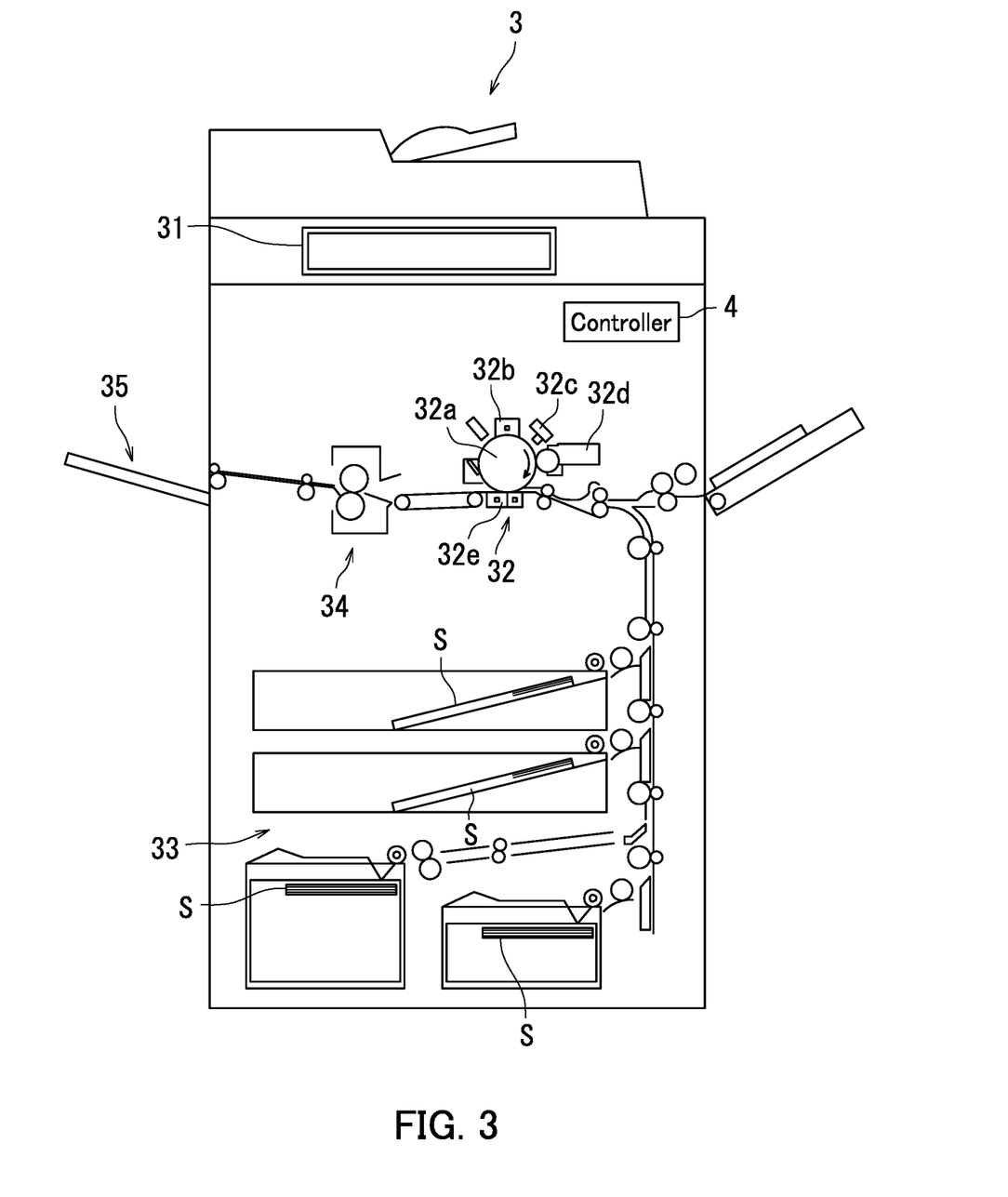
FIG. 3 is a diagram illustrating a configuration of an image forming apparatus according to the embodiments of the present disclosure.

Next, a configuration of the image forming apparatus 3 will be further described with reference to FIGS. 1 and 3. FIG. 3 is a diagram illustrating the configuration of the image forming apparatus 3. As illustrated in FIG. 3, the image forming apparatus 3 is a multifunction peripheral. The multifunction peripheral includes a printer function, for example. The multifunction peripheral also includes at least one of the following functions, for example: a copy function and a facsimile function.

The image forming apparatus 3 further includes a sheet feed section 33, a fixing section 34, and an ejection table 35 in addition to the input section 31, the image forming section 32, and the controller 4. The image forming apparatus 3 forms an image on a sheet S fed from the sheet feed section 33. The sheet S is an example of a recording medium according to the present disclosure. Examples of the sheet S include plain paper, copy paper, recycled paper, thin paper, thick paper, glossy paper, or overhead projector (OHP) transparency.

The image forming section 32 includes an image bearing member 32a, a charger 32b, an exposure section 32c, a development section 32d, and a transfer section 32e. The image forming section 32 forms a toner image on the sheet S. The fixing section 34 fixes the toner image to the sheet S. The sheet S with the toner image fixed thereon is ejected to the ejection table 35.

The input section 31 includes a display, for example. The display displays various screens. The input section 31 also includes a touch panel function.

Figure 4A:
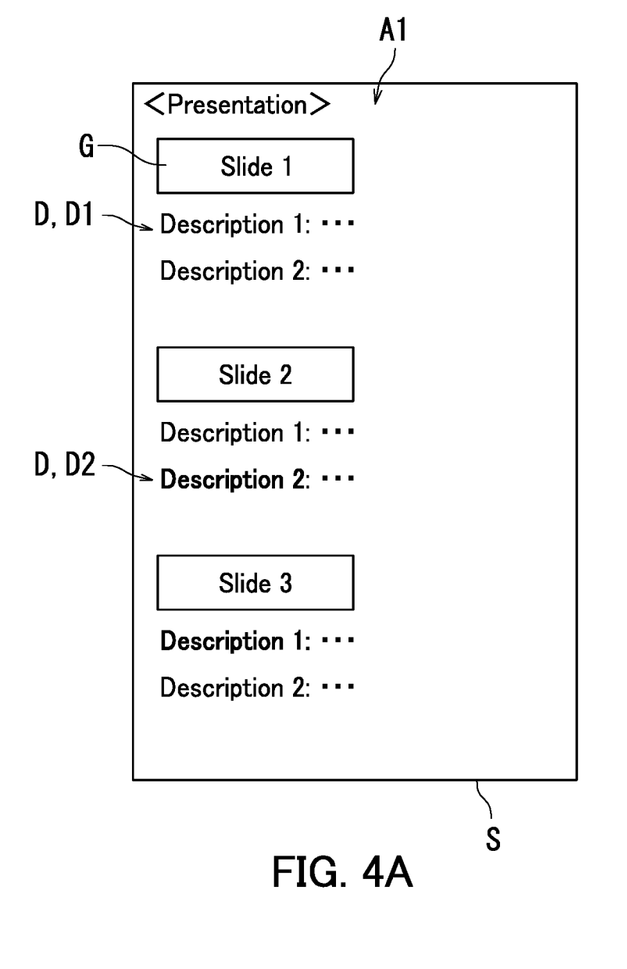
FIG. 4A is a diagram illustrating an example of a first transcript formed on a sheet.
Figure 4B:
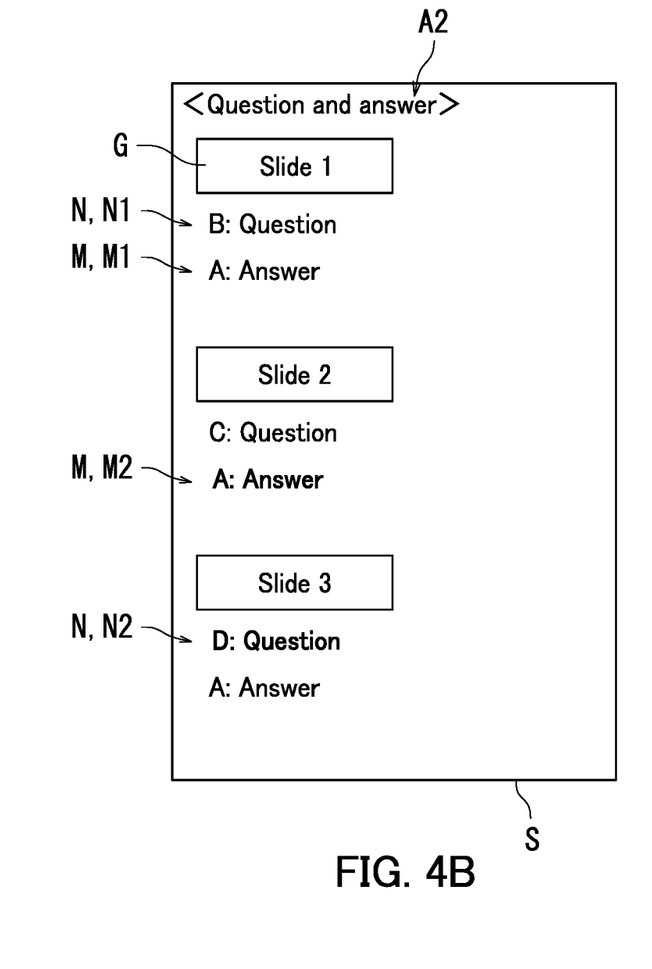
FIG. 4B is a diagram illustrating an example of a second transcript formed on a sheet.

Next, the controller 4 will be further described with reference to FIGS. 1, 4A, and 4B. First, the transcript according to the present embodiment will be described with reference to FIGS. 4A and 4B. The transcript is divided into a first transcript A1 and a second transcript A2. FIG. 4A is a diagram illustrating an example of the first transcript A1 formed on a sheet S. FIG. 4B is a diagram illustrating an example of the second transcript A2 formed on a sheet S. The first transcript A1 exhibits the presentation content of the presenter. The second transcript A2 exhibits question and answer content of the presenter and the questioner.

As illustrated in FIG. 4A, the first transcript A1 is formed on a sheet S. The first transcript A1 includes a plurality of slides G and descriptions D of each slide G. Each description D exhibits description content from the presenter corresponding to a slide G. The description D is located directly beneath the corresponding slide G. In the first transcript A1, the slides G and the descriptions D are arranged in an order that corresponds to the time line of the meeting, for example.

The descriptions D include a description D1 and a description D2. The description D2 is an emphasized portion, and is formed in bold characters so as to have more emphasis than the description D1. Note that the description D2 may have a different color than the description D1, for example. The description D2 may also be underlined.

As illustrated in FIG. 4B, the second transcript A2 is formed on a sheet S. The second transcript A2 includes a plurality of slides G, questions N, and answers M for each question N. Each question N exhibits question content of a questioner. Each answer M exhibits answer content of the presenter corresponding to a question N. In the second transcript A2, the slides G, questions N, and answers M are arranged in an order that corresponds to the time line of the meeting, for example. Each question N is located directly beneath a corresponding slide G. Each answer M is located directly beneath a corresponding question N.

The questions N include a question N1 and a question N2. The answers M include an answer M1 and an answer M2. The question N2 and the answer M2 are emphasized portions, and are formed in bold characters so as to have more emphasis than the question N1 and the answer M1. Note that the question N2 and the answer M2 may have a different color than the question N1 and the answer M1, for example. The question N2 and the answer M2 may also be underlined.

Continuing, the controller 4 will be further described with reference to FIGS. 1, 4A, and 4B. The controller 4 described with reference to FIG. 1 generates the transcript information based on the proceedings information and the material information. The controller 4 also directs the image forming section 32 to form an image exhibiting the content of the first transcript A1 on a sheet S based on the transcript information. The controller 4 further directs the image forming section 32 to form an image exhibiting the content of the second transcript A2 on a sheet S based on the transcript information.

The searching section 41 searches for unnecessary information based on the proceedings information. The unnecessary information indicates content that is not necessary to include in the transcript content. The unnecessary information is chatting between fellow participants in the meeting, for example. Voices indicating chatting are low in volume.

According to the present embodiment, the searching section 41 searches for the unnecessary information based on the proceedings information of second participants. The second participants are participants aside from the first participants among the plurality of participants. The searching section 41 specifies the proceedings information of the second participants from the proceedings information of the plurality of participants based on the classification of the participants stored in the storage. The searching section 41 searches for low volume areas that are unnecessary information in the voice information included in the proceedings information of the second participants. The low volume areas are areas in which a speaking volume is lower than a first threshold in a time line of the voices. The first threshold is preset.

The generating section 42 deletes the unnecessary information from the proceedings information and generates the transcript information. In detail, the generating section 42 deletes the unnecessary information from the voice information included in the proceedings information of each second participant. The generating section 42 then generates character information based on the voice information from which the unnecessary information has been deleted. The generating section 42 generates the character information from the voice information by using speech recognition, for example. The character information indicates a plurality of character strings. The generating section 42 also generates the character information based on the voice information included in the proceedings information of the first participants. The generating section 42 stores the character information in the storage. Specifically, the generating section 42 arranges the character strings to follow the time line of the meeting and stores the character strings in the storage.

According to the present embodiment, the generating section 42 classifies the character strings. The generating section 42 classifies the character strings into two classes: character strings exhibiting the presentation content and character strings exhibiting the question and answer content. In detail, the generating section 42 specifies question and answer periods in the time line of the meeting based on the proceedings information and the character information. The generating section 42 specifies character strings indicating voices spoken during each question and answer period to be character strings exhibiting the question and answer content from among the character strings. The question and answer periods are periods in the time line of the meeting between question and answer beginnings and question and answer endings. According to the present embodiment, the generating section 42 also specifies other character strings to be character strings exhibiting the presentation content from among the character strings. The other character strings to be specified as exhibiting the presentation content are character strings aside from the character strings indicating the voices spoken during the question and answer periods.

The generating section 42 specifies a question and answer beginning based on the character information. The question and answer beginning is when speech of the participants other than the presenter begins. In detail, the generating section 42 specifies the character strings indicating voices other than that of the presenter to be questions N based on the character strings. The generating section 42 specifies a time at which a question N begins to be spoken in the time line of the meeting to be the question and answer beginning.

The generating section 42 specifies a question and answer ending based on the proceedings information and the character information. The generating section 42 determines whether or not the character strings include specific character strings following the questions N based on the character strings, for example. The generating section 42 specifies the question and answer ending depending on the positions of the specified character strings in the time line. The question and answer ending is when speech corresponding to a specific character string has ended. The specific character strings are preset. Typically, the specific character strings are "understood" and "thank you", for example.

The generating section 42 also determines the question and answer ending based on the proceedings image of the presenter from the proceedings information, for example. In detail, the generating section 42 specifies a participant exhibited in the proceedings image of the presenter after the question and answer beginning to be a questioner. The generating section 42 determines whether or not the proceedings image includes a participant by using facial recognition, for example. After specifying the questioner, the generating section 42 measures the period during which the questioner is absent from the proceedings image of the presenter. The generating section 42 specifies the timing at which the measured period has exceeded a predetermined period to be the question and answer ending.

The generating section 42 specifies the character strings between the question and answer beginning and the question and answer ending to be character strings indicating the question and answer content. The generating section 42 specifies the character strings indicating the voice of the presenter among the character strings indicating the question and answer content to be the answers M. The generating section 42 also specifies the character strings indicating the voices other than that of the presenter among the character strings indicating the question and answer content to be the questions N.

The generating section 42 generates transcript information indicating the first transcript A1 based on the material information and the character strings indicating the presentation content. In detail, the generating section 42 rearranges the slides G in the storage area to follow the time line. The generating section 42 also rearranges the character strings indicating the presentation content in the storage area to follow the time line as the descriptions D. As a result, each description D is located directly beneath the slide G to which the description D corresponds. Note that the descriptions D placed directly beneath the slides G may be divided into a plurality of levels based on a timing of the speech of the presenter. Specifically, the generating section 42 divides the descriptions D into separate levels in the storage area when the presenter has not spoken for more than a predetermined period.

The generating section 42 generates transcript information indicating the second transcript A2 based on the material information and the character strings indicating the question and answer content. In detail, the generating section 42 rearranges the slides G in the storage area to follow the time line. The generating section 42 also rearranges the questions N and the answers M in the storage area to follow the time line. As a result, the questions N and the answers M are located directly beneath the slides G.

The specifying section 43 specifies the emphasized portions that are emphasized in the transcript. According to the present embodiment, an emphasized portion is a portion of the descriptions D, the questions N, and the answers M. The emphasized portion is formed in bold characters on the sheet S.

The specifying section 43 specifies periods in which the proceedings images of the participants aside from the presenter indicate a specific image. The specific image is the material used in the meeting. The material used in the meeting is an image exhibiting a slide G. According to the present embodiment, the images indicating the slides G are specified depending on whether or not the image includes an AR marker. The specifying section 43 specifies the periods in which the specific image is indicated for each of the proceedings images of the participants aside from the presenter.

The specifying section 43 calculates a number of proceedings images indicating the specific image during periods that overlap in the time line of the meeting. This is done after the periods in which the specific image is indicated have been specified for each of the proceedings images of the participants aside from the presenter. As a result, the number of participants viewing a given slide G at the same time in the time line of the meeting is specified. The specifying section 43 specifies the character strings indicating voices during a period in which the periods overlap to be the emphasized portions when the specified number of proceedings images is greater than a second threshold. The second threshold is preset.

The specifying section 43 edits the transcript information so that the emphasized portions are formed in bold characters. Note that the specifying section 43 may specify images exhibiting the slides G by using image recognition, for example, instead of the AR markers.

The first adjuster 44 adjusts the first threshold when excess or deficiency information is inputted after the transcript information has been generated. The excess or deficiency information indicates an excess or a deficiency of the transcript content.

The first adjuster 44 reduces the first threshold when the deficiency information indicating deficient transcript content is inputted, for example. As a result, for example, the unnecessary information to be found in the proceedings information by the searching section 41 decreases and the transcript content increases when the transcript is generated again. According to the present embodiment, the number of the questions N increases. The first adjuster 44 also increases the first threshold when the excess information indicating excessive transcript content is inputted, for example. As a result, for example, the unnecessary information to be found in the proceedings information by the searching section 41 increases and the transcript content decreases when the transcript is generated again. According to the present embodiment, the number of the questions N decreases. Accordingly, work of adding or reducing the transcript content can be reduced, and an amount of work for a worker can be mitigated.

The second adjuster 45 adjusts the second threshold when excess or deficiency information is inputted after the transcript information has been generated. The excess or deficiency information indicates an excess or deficiency of emphasized portions in the transcript.

The second adjuster 45 reduces the second threshold when the deficiency information indicating deficient emphasized portions is inputted, for example. As a result, for example, the emphasized portions to be specified by the specifying section 43 increase and the emphasized portions in the transcript increase when the transcript is generated again. The second adjuster 45 also increases the second threshold when the excess information indicating excessive emphasized portions is inputted, for example. As a result, for example, the emphasized portions to be specified by the specifying section 43 decrease and the emphasized portions of the transcript decrease when the transcript is generated again. Accordingly, work of adding or reducing emphasized portions in the transcript content can be reduced, and the amount of work for the worker can be mitigated.

In the information processing system 1 according to the present embodiment, the unnecessary information from the proceedings information indicating the transcript content is found, and the transcript information indicating the transcript content in which the unnecessary information has been deleted is generated. As a result, work of deleting the unnecessary information from the transcript decreases, and the amount of work for the worker can be mitigated.

Figure 5:
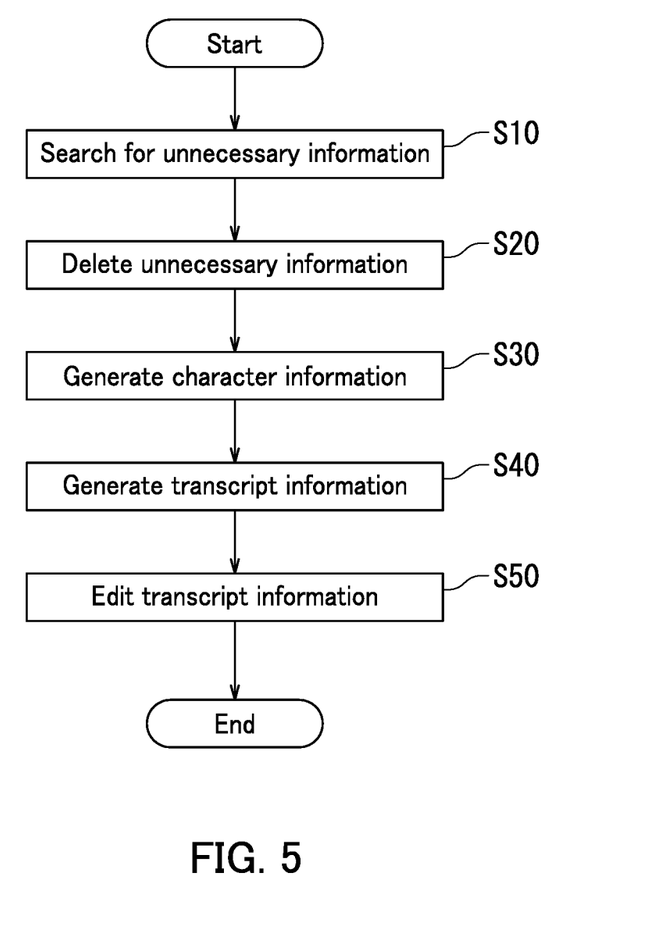
FIG. 5 is a flowchart illustrating a generation process of transcript information by a controller according to an embodiment of the present disclosure.

Next, a generation process of the transcript information by the controller 4 will be described with reference to FIG. 5. FIG. 5 is a flowchart illustrating the generation process of the transcript information by the controller 4. The controller 4 performs the generation process of the transcript information when an operation signal instructing the generation of the transcript information is inputted, after the proceedings information and the material information has been inputted, for example.

As illustrated in FIG. 5, after the operation signal is inputted, the controller 4 searches for the unnecessary information from the proceedings information based on the voices in Step S10. After finding the unnecessary information, the controller 4 deletes the unnecessary information from the proceedings information in Step S20. After deleting the unnecessary information, the controller 4 generates the character information in Step S30 based on the proceedings information from which the unnecessary information has been deleted.

After generating the character information, the controller 4 generates the transcript information indicating the transcript based on the character information and the material information in Step S40. After generating the transcript information, the controller 4 specifies the emphasized portions based on the proceedings information and edits the transcript information so as to emphasize the emphasized portions in Step S50. The controller 4 ends the generation process of the transcript information after editing the transcript information.

The information processing system 1 according to the first embodiment of the present disclosure has been described above with reference to FIGS. 1 to 5. However, the present disclosure is not limited to the above-described embodiment and can be practiced in various ways within the scope not departing from the essence thereof.

Second Embodiment

In the first embodiment, the searching section 41 searches for the unnecessary information based on the proceedings information. In a second embodiment however, a searching section 41 may search for question and answer content based on proceedings information. Also in the first embodiment, the generating section 42 deletes the unnecessary information from the proceedings information and generates the transcript information. In the second embodiment however, a generating section 42 generates character information based on the proceedings information.

The searching section 41 and the generating section 42 according to the second embodiment will be described with reference to FIGS. 1, 4A, and 4B.

The generating section 42 generates character information based on the proceedings information. In detail, the generating section 42 generates the character information based on each voice of a plurality of participants. The generating section 42 generates the character information from the voices by using speech recognition, for example. The character information indicates a plurality of character strings. The generating section 42 arranges the character strings to follow a time line of a meeting and stores the character strings in the storage.

The searching section 41 searches for question and answer content from the proceedings information based on the proceedings information. According to the present embodiment, the searching section 41 searches for character strings exhibiting the question and answer content from the character strings. The searching section 41 searches for the question and answer content, and classifies the character strings into two classes: character strings indicating the question and answer content or character strings indicating presentation content. In detail, the searching section 41 specifies the character strings indicating voices spoken in question and answer periods to be character strings exhibiting the question and answer content from among the character strings. The question and answer periods are periods in the time line of the meeting between question and answer beginnings and question and answer endings. According to the present embodiment, the searching section 41 also specifies other character strings to be character strings exhibiting the presentation content among the character strings. The other character strings to be specified as exhibiting the presentation content are character strings aside from the character strings indicating the voices spoken in the question and answer periods.

The searching section 41 specifies a question and answer beginning based on the character information. The question and answer beginning is when speech of the participants other than a presenter begins. In detail, the searching section 41 specifies the character strings indicating voices other than that of the presenter to be questions N from among the character strings. The searching section 41 specifies at time at which the questions N begin to be spoken in the time line of the meeting to be the question and answer beginning.

The searching section 41 specifies a question and answer ending based on the proceedings information and the character information. The searching section 41 determines whether or not the character strings includes specific character strings following the questions N based on the character strings, for example. The searching section 41 specifies the question and answer ending depending on the positions of the specified character strings in the time line. The question and answer ending is when speech corresponding to a specified character string has ended. The specified character strings are preset. Typically, the specified character strings are "understood" and "thank you", for example.

The searching section 41 specifies a period in which a character string indicating the voice of the presenter is continuous after the question and answer beginning. When the period in which the character string indicating the voice of the presenter is continuous exceeds a third threshold in the time line of the meeting, the searching section 41 specifies the continuous character string of the presenter to be a character string indicating the question and answer ending. The third threshold is preset. In this case, the question and answer ending is when the continuous character string of the presenter has exceeded the third threshold. The searching section 41 also specifies a timing at which the slides G change to be the question and answer ending based on material information.

The searching section 41 also specifies the question and answer ending based on the proceedings image of the presenter in the proceedings information, for example. In detail, the searching section 41 specifies a participant indicated by the proceedings image of the presenter after the question and answer beginning to be a questioner. The searching section 41 determines whether or not the proceedings image includes a participant by using facial recognition, for example. After specifying the questioner, the searching section 41 measures the period during which the questioner is absent from the proceedings image of the presenter. The searching section 41 specifies the timing at which the measured period has exceeded a predetermined period to be the question and answer ending. The predetermined period is a fourth threshold. The predetermined period is preset.

The searching section 41 specifies the character strings of the question and answer period to be character strings exhibiting the question and answer content. The searching section 41 specifies the character strings indicating the voice of the presenter among the character strings indicating the question and answer content to be the answers M. The searching section 41 attaches a tag indicating an answer M to each character string specified as an answer M. The tag further indicates a slide G corresponding to the answer M.

The searching section 41 also specifies the character strings indicating the voices other than that of the presenter to be the questions N from among the character strings indicating the question and answer content. The searching section 41 attaches a tag indicating a question N to each character string specified as a question N. The tag further indicates a slide G corresponding to the question N.

The searching section 41 specifies the character strings indicating the voice of the presenter outside of the question and answer period to be the descriptions D. The searching section 41 adds a tag indicating a description D to each character string specified as a description D. The tag further indicates a slide G corresponding to a position of the description D in the time line. Note that when specifying the question and answer ending based on the third threshold, the searching section 41 specifies a continuous character string that exceeds the third threshold to be an answer M as well as a description D. The searching section 41 attaches a tag indicating an answer M and a description D to the character string that has been specified as an answer M and a description D. The tag further indicates a slide G corresponding to the continuous character string.

The generating section 42 generates transcript information indicating content of a first transcript A1 based on the material information and the character strings to which the tags indicating the descriptions D have been attached. In detail, the generating section 42 rearranges the slides G in a storage area to follow the time line. The generating section 42 also places the descriptions D directly beneath the slides G indicated by the tags in the storage area. Note that the descriptions D placed directly beneath the slides G may be divided into a plurality of levels based on a timing of the speech of the presenter. Specifically, the generating section 42 divides the descriptions D into the separate levels in the storage area when the presenter has not spoken for more than a predetermined period.

The generating section 42 generates transcript information indicating content of a second transcript A2 based on the material information, the character strings to which the tags indicating the questions N have been attached, and the character strings to which the tags indicating the answers M have been attached. In detail, the generating section 42 rearranges the slides G in the storage area to follow the time line. The generating section 42 places the questions N and the answers M directly beneath the slides G indicated by the tags in the storage area. Specifically, the questions N are placed directly beneath the slides G, and the answers M are placed directly beneath the questions N.

In the information processing system 1 according to the present embodiment, the first transcript A1 indicating the presentation content of the meeting and the second transcript A2 indicating the question and answer content of the meeting can be generated based on the proceedings information and the material information. Accordingly, the transcript content can be prevented from becoming too long by the generation of the second transcript A2 as a transcript when a long description D is recorded for a slide G.

Figure 6:
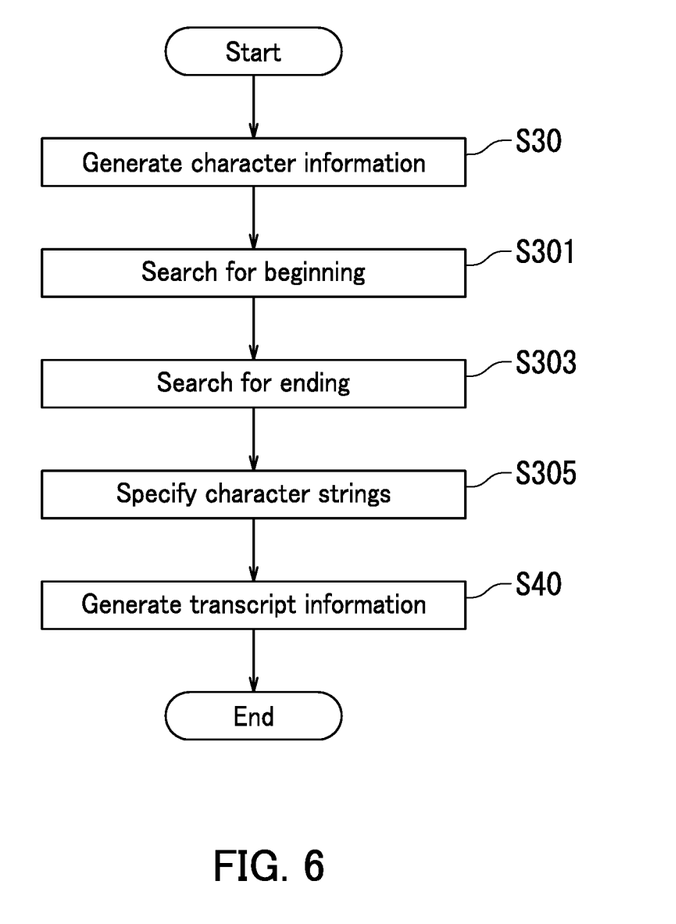
FIG. 6 is a flowchart illustrating a generation process of the transcript information by the controller according to an embodiment of the present disclosure.

Next, a generation process of the transcript information by the controller 4 will be described with reference to FIG. 6. FIG. 6 is a flowchart illustrating the generation process of the transcript information by the controller 4. After the proceedings information and the material information have been inputted, for example, the controller 4 performs the generation process of the transcript information when an operation signal instructing the generation of the transcript information is inputted.

As illustrated in FIG. 6, after the operation signal has been inputted, the controller 4 generates the character information based on the proceedings information in Step S30. After generating the character information, the controller 4 searches for the question and answer beginning in Step S301. After finding the beginning, the controller 4 searches for the question and answer ending in Step S303.

After finding the ending, the controller 4 specifies character strings indicating the question and answer content and character strings indicating the presentation content based on the beginning and the ending in Step S305. After specifying the character strings, the controller 4 generates the transcript information indicating the content of the first transcript A1 and the second transcript A2 based on the specified character strings and the material information in Step S40. The controller 4 ends the generation process of the transcript information after generating the transcript information.

The information processing system 1 according to the first and second embodiments of the present disclosure has been described above with reference to FIGS. 1 to 6. However, the present disclosure is not limited to the above-described embodiments and can be practiced in various ways within the scope not departing from the gist of the present disclosure.

For example, according to the first and second embodiments of the present disclosure, images exhibiting the transcript content are formed on sheets S based on the transcript information. However, the present disclosure is not limited thereto. The transcript need only be viewable at least by the participants. For example, the transcript information may be outputted from the image forming apparatus 3 to personal computers possessed by the participants, and each participant may see the transcript through a monitor included in the personal computer. Note that the transcript information is outputted to the personal computers from the image forming apparatus 3 through e-mail or recording media, for example.

Also according to the first and second embodiments of the present disclosure, the image forming apparatus 3 described as an example of a terminal device generates the transcript information based on the proceedings information and the material information. However, the present disclosure is not limited thereto. The terminal device need only be able to generate the transcript information based on the proceedings information and the material information. The terminal device may be a personal computer, for example. In such a case, transcript information may be outputted to the image forming apparatus 3 from the terminal device, and images exhibiting a transcript may be formed on a sheet S by the image forming apparatus 3.

Furthermore according to the first and second embodiments of the present disclosure, the acquiring devices 2, the image forming apparatus 3, and the presenter terminal 7 are connected through the communication network L. However, the present disclosure is not limited thereto. The acquiring devices 2 need only be able to output the proceedings information to the image forming apparatus 3, and the presenter terminal 7 need only be able to output the material information to the image forming apparatus 3. For example, proceedings information and material information are outputted to an image forming apparatus 3 from the acquiring devices 2 and the presenter terminal 7 through recording media.

Note that the drawings are schematic illustrations that emphasize each element of configuration in order to facilitate understanding thereof. Properties of the elements of configuration illustrated in the drawings, such as thicknesses and lengths thereof, may differ from actual properties thereof in order to facilitate preparation of the drawings. Also note that properties of each element in the above-mentioned embodiments such as shapes thereof are but one example and not intended as any specific limitation. The elements may be altered within the scope not substantially departing from the effects of the present disclosure.

What is claimed is:

1. An information processing system, comprising:
one or more acquiring devices configured to acquire proceedings information indicating meeting content from a plurality of participants participating in a meeting; and
a terminal device configured to delete unnecessary information that is unnecessary as transcript content from the proceedings information and generate transcript information indicating the transcript content, wherein
the terminal device comprises:
a searching section configured to search for the unnecessary information from the proceedings information; and
a generating section configured to delete the unnecessary information from the proceedings information and generate the transcript information,
the searching section searches for a voice of a participant of which volume is lower than a first threshold as the unnecessary information, based on the proceedings information of the participant among the plurality of participants aside from first participants, and
the first participants include a presenter who describes presentation content in the meeting and a predetermined participant among the plurality of participants aside from the presenter.

2. The information processing system according to claim 1, wherein
each of the acquiring devices comprises:
a recording section configured to record a voice of a participant; and
an imaging section configured to record a proceedings image indicating an image that records an environment in a field of view of the participant, and
the proceedings information includes the voice of the participant and the proceedings image.

3. The information processing system according to claim 2, wherein
the terminal device
specifies, for each of the proceedings images, a period in which the proceedings image indicates a specific image,
further specifies a number of the proceedings images indicating the specific image during periods that overlap in a time line of the meeting, and
specifies voice content of the participants during a period in which the periods in which the specific images are indicated overlap to be an emphasized portion when the number of the proceedings images is greater than a second threshold.

4. The information processing system according to claim 3, wherein
the terminal device adjusts the second threshold based on excess or deficiency information indicating an excess or a deficiency of the emphasized portion in the transcript content.

5. The information processing system according to claim 1, wherein
the terminal device adjusts the first threshold based on excess or deficiency information indicating an excess or a deficiency of the transcript content.

6. The information processing system according to claim 1, wherein
the terminal device is an image forming apparatus, and
the image forming apparatus forms an image on a recording medium based on the transcript information.

7. An information processing system, comprising:
one or more acquiring devices configured to acquire proceedings information indicating meeting content from a plurality of participants participating in a meeting; and
a terminal device configured to delete unnecessary information that is unnecessary as transcript content from the proceedings information and generate transcript information indicating the transcript content, wherein
each of the acquiring devices comprises:
a recording section configured to record a voice of a participant; and
an imaging section configured to record a proceedings image indicating an image that records an environment in a field of view of the participant,
the proceedings information includes the voice of the participant and the proceedings image, and
the terminal device:
specifies, for each of the proceedings images, a period in which the proceedings image indicates a specific image,
further specifies a number of the proceedings images indicating the specific image during periods that overlap in a time line of the meeting, and
specifies voice content of the participants during a period in which the periods in which the specific images are indicated overlap to be an emphasized portion when the number of the proceedings images is greater than a threshold.

8. The information processing system according to claim 7, wherein the terminal device adjusts the threshold based on excess or deficiency information indicating an excess or a deficiency of the emphasized portion in the transcript content.

9. The information processing system according to claim 7, wherein
the terminal device is an image forming apparatus, and
the image forming apparatus forms an image on a recording medium based on the transcript information.

* * * * *